(12) United States Patent
Kumakura et al.

(10) Patent No.: US 6,439,390 B1
(45) Date of Patent: Aug. 27, 2002

(54) BATTERY PACKAGE

(75) Inventors: Katsuhiko Kumakura, Soraku-gun; Tadashi Ono, Hirakata, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/914,510

(22) PCT Filed: Jun. 12, 2000

(86) PCT No.: PCT/JP00/03824

§ 371 (c)(1),
(2), (4) Date: Aug. 28, 2001

(87) PCT Pub. No.: WO01/08998

PCT Pub. Date: Feb. 8, 2001

(30) Foreign Application Priority Data

Jul. 29, 1999 (JP) .......................................... 11-215510
Aug. 3, 1999 (JP) .......................................... 11-220477
Aug. 5, 1999 (JP) .......................................... 11-223067

(51) Int. Cl.⁷ .............................................. B65D 85/88
(52) U.S. Cl. ...................................... 206/705; 206/469
(58) Field of Search ............................... 206/703–705, 206/461, 471, 530, 531, 532, 539, 775, 776, 806, 469

(56) References Cited

U.S. PATENT DOCUMENTS 3,759,371 A * 9/1973 Marks ........................ 206/531
4,958,731 A 9/1990 Calcerano
5,735,404 A * 4/1998 Kumakura et al. .......... 206/705
5,899,333 A * 5/1999 Williams et al. ............ 206/705
6,311,845 B1 * 11/2001 Uren et al. .................. 206/705

FOREIGN PATENT DOCUMENTS

| JP | 44-12556 | 6/1969 |
| JP | 62-69479 U | 5/1987 |
| JP | 62-109785 A | 5/1987 |
| JP | 1-103567 U | 7/1989 |
| JP | 3-212373 A | 9/1991 |

* cited by examiner

*Primary Examiner*—Luan K. Bui
(74) *Attorney, Agent, or Firm*—Akin, Gump, Strauss, Hauer & Feld, L.L.P.

(57) ABSTRACT

The present description discloses a battery package comprising a transparent synthetic resin film provided with at least one battery holding portion having a recess for containing a single cylindrical battery, and a mounting board which is bonded to and supports the film and closes an opening of the recess, wherein the film has a corner portion corresponding to a peripheral edge portion of the battery which is thinner than the rest. Such a battery package is capable of packing a battery with its labeled surface showing the brand thereof or the like positioned on the front side constantly and allowing easy removal of the battery for use.

6 Claims, 6 Drawing Sheets

BATTERY PACKAGE

TECHNICAL FIELD

The present invention relates to a battery package for containing small-sized cylindrical batteries such as AA-size dry batteries for sale.

BACKGROUND ART

There are various types of packages for containing daily-use small-sized articles such as batteries for sale. In the field of batteries, a so-called "shrink package" or "blister package" which wraps two or four batteries by means of a transparent heat-shrinkable resin tube has been widely used. The number of batteries to be contained in such a package varies depending upon the equipment which uses such batteries.

A typical CD player or MD player, for example, normally uses a single AA-size dry battery. Users usually have a stock of a plurality of batteries at hand. Such users prefer a battery package containing a plurality of batteries independently one by one to a package containing a plurality of batteries collectively in one. Once a package containing a plurality of batteries collectively in one is opened, the respective batteries are scattered and, hence, it becomes difficult to make a distinction between used ones and unused ones.

On the other hand, as to a package containing a plurality of batteries independently one by one, each battery can be separated and opened every time when they are used and, hence, unused ones can be clearly distinguished from used ones and stored separately therefrom.

As described above, in a package containing a plurality of batteries independently one by one, it is desired to pack the batteries in an arrangement where the labeled surface of each battery is positioned on the front side of the package so that the type, grade, brand and the like displayed on the peripheral surface of each battery can be directly identified from the front of the package.

A conventional package of this type comprises a blister formed of a resin film having a recess for containing a battery, and a mounting board which is bonded to and support the blister and closes the opening defined by the recess. In this package, an inconvenience arises such that each battery cannot be fixed firmly and easily rotates in the recess due to vibration or the like that occurs during transportation to dislocate the labeled surface thereof from the front side of the package.

Further, in such a package, the mounting board which closes the opening of the recess needs to be peeled off to take out the battery and, for easier taking out of the battery, the mounting board is provided with a perforation at the portion of the mounting board closing the recess.

However, depending on the type of mounting boards, a strong force may be required to tear the mounting board along the perforation to open the recess. Besides, there has been a problem that the mounting board is difficult to tear along the perforation and, therefore, only the mounting board is torn off half way or the appearance of the torn surface becomes marred.

Further, in the recent heightened awareness of environmental issues, a package comprising a plurality of components made of different materials as described above is not very preferable in the standpoint of disposal or recycling. In other words, for separate collection in disposal, for instance, the film and the mounting board are preferably made of the same material.

Additionally, since the above packages are used to contain various articles as well as batteries, it is preferable that they should be transparent for the inside thereof to be fully seen through.

In view of the above standpoint, it is a first object of the present invention to provide a battery package which allows easy taking out of a battery fixed as described above by opening the package.

It is a second object of the present invention to solve the aforementioned problems of battery packages containing a plurality of batteries independently one by one and to provide a battery package which can fix individual batteries against their rotation so that the labeled surface showing the brand and the like of each battery is constantly positioned on the front side of the package.

It is a third object of the present invention to provide a battery package formed of a single material which is suitable for separate collection and recycling.

DISCLOSURE OF INVENTION

The present invention relates to a battery package comprising a transparent synthetic resin film which is provided with at least one battery holding portion having a recess for containing a single cylindrical battery, and a mounting board which is bonded to and supports the film and closes an opening of the recess, wherein a corner portion of the film corresponding to a peripheral edge portion of the battery is thinner than the rest.

In the above battery package, it is effective that the recess of the film has a groove for guiding a terminal cap of the battery in a side wall corresponding to a terminal cap side of the battery and the battery is pressed against the mounting board at a terminating end of the groove.

It is also effective that the mounting board is made of paper and paper fibers constituting the mounting board are aligned parallel to an opening perforation provided on the mounting board in a longitudinal direction of the battery.

Alternatively, it is effective that the mounting board is made of a synthetic resin and has an opening perforation in a portion other than that bonded to the film.

BEST MODE FOR CARRYING OUT THE INVENTION

Figure 1:
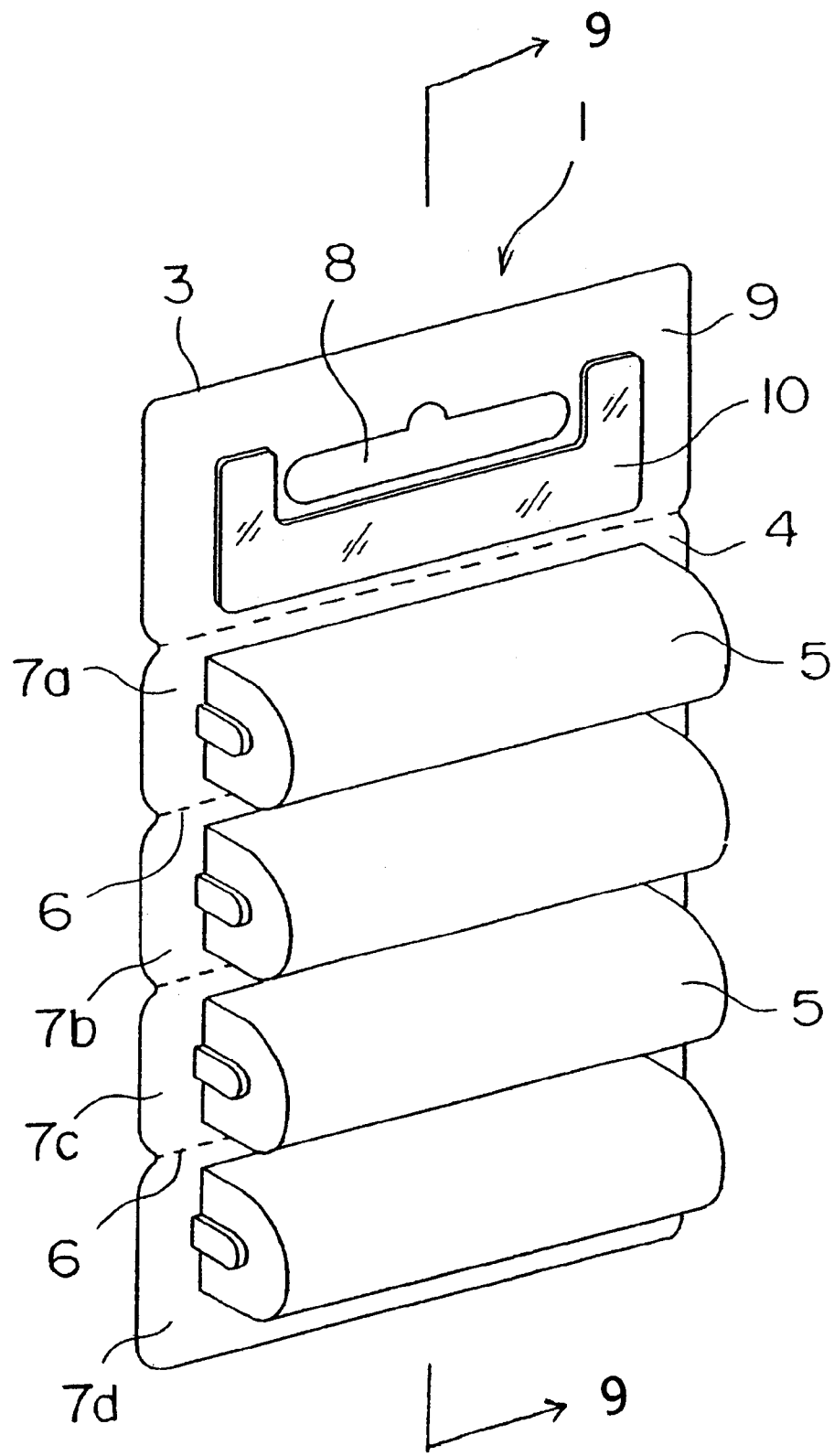
FIG. 1 is a perspective view of a battery package in accordance with Embodiment 1 of the present invention.

A battery package in accordance with the present invention may include various constituents for attaining the first to third objects described above.

The present invention relates to a battery package comprising a transparent synthetic resin film which is provided with at least one battery holding portion having a recess for containing a single cylindrical battery, and a mounting board which is bonded to and supports the film and closes an opening of the recess, wherein a corner portion of the film corresponding to a peripheral edge portion of the battery is thinner than the rest.

It is effective that a central portion of the bottom wall of the recess of the film is thicker and the battery is pressed against the mounting board by the thicker portion.

Further, it is effective that the recess of the film has a groove for guiding a terminal cap of the battery in a side wall corresponding to a terminal cap side of the battery and the battery is pressed against the mounting board at a terminating end of the groove.

In the battery package, it is effective that the mounting board has an opening perforation for opening the recess. In this case, it is effective that the mounting board has the opening perforation in a portion other than that bonded to the film.

Further, it is effective that the film and the mounting board have a separating perforation for separating an individual battery holding portion of the film together with the mounting board from the rest in their bonded portion.

Further, it is effective that the mounting board is made of paper and paper fibers constituting the mounting board are aligned parallel to the perforation in a longitudinal direction of the battery. In this case, it is effective that the mounting board comprises a plurality of layers and paper fibers forming each of the layers are aligned parallel to the perforation in the longitudinal direction of the battery.

Alternatively, it is effective that the mounting board is made of a synthetic resin as with the film. In this case, it is effective that the mounting board has an opening perforation in a portion other than that bonded to the film.

The battery package in accordance with the present invention may include two or more of the above features for attaining respective ones of the objects, and in this case, it is possible to provide an excellent battery package which can attain two or more of the objects.

Hereinafter, embodiments adapted for the first to third objects of the present invention, respectively, will be described, but the present invention is not limited to these embodiments.

Embodiment 1

In a battery package in accordance with Embodiment 1 of the present invention, a battery holding portion provided on a transparent synthetic resin film bonded to a mounting board has a recess for containing a battery, and the recess has a groove for guiding the terminal cap of the battery. The provision of the groove allows the top portion and collar portion of the terminal cap and bottom portion of the battery to come into intimate contact with the corresponding side walls of the recess of the film. Thus, the battery can be pressed and restrained at its top and bottom (top end and bottom end) by the film and hence can be prevented from rotating in the recess due to vibration or the like.

It is possible to design the battery package of this type so that the recess for containing a battery of the resin film is sized to tightly contact the battery. Since the height of the battery is greater than the diameter thereof, the recess has a rectangular configuration having a longer side, which corresponds to the periphery of the battery.

Further, the provision of the guiding groove makes it possible to press the battery against the mounting board by the terminating end of the groove. Alternatively, such an arrangement is possible that a central portion of the bottom wall of the recess of the film is made thicker and the battery is pressed against the mounting board by the thicker portion. These arrangements can effectively prevent the battery from rotating in the package.

With such a battery package wrapping a battery while pressing it against the mounting board to prevent rotation of the battery in the recess of the film, sometimes the battery cannot be taken out easily because it is fit tightly into the recess of the film when the portion of the mounting board, which closes the opening of the recess, is torn off along the perforation.

In the package of the present invention, however, the film is made thinner at corner portions corresponding to the peripheral edge portions of the battery. Therefore, by pressing such thinner corner portions with a finger to press a peripheral edge portion of the battery, the battery can be sprung out of the recess easily.

Hereinafter, the present invention will be described with reference to the figures illustrating the embodiments thereof.

Figure 2:
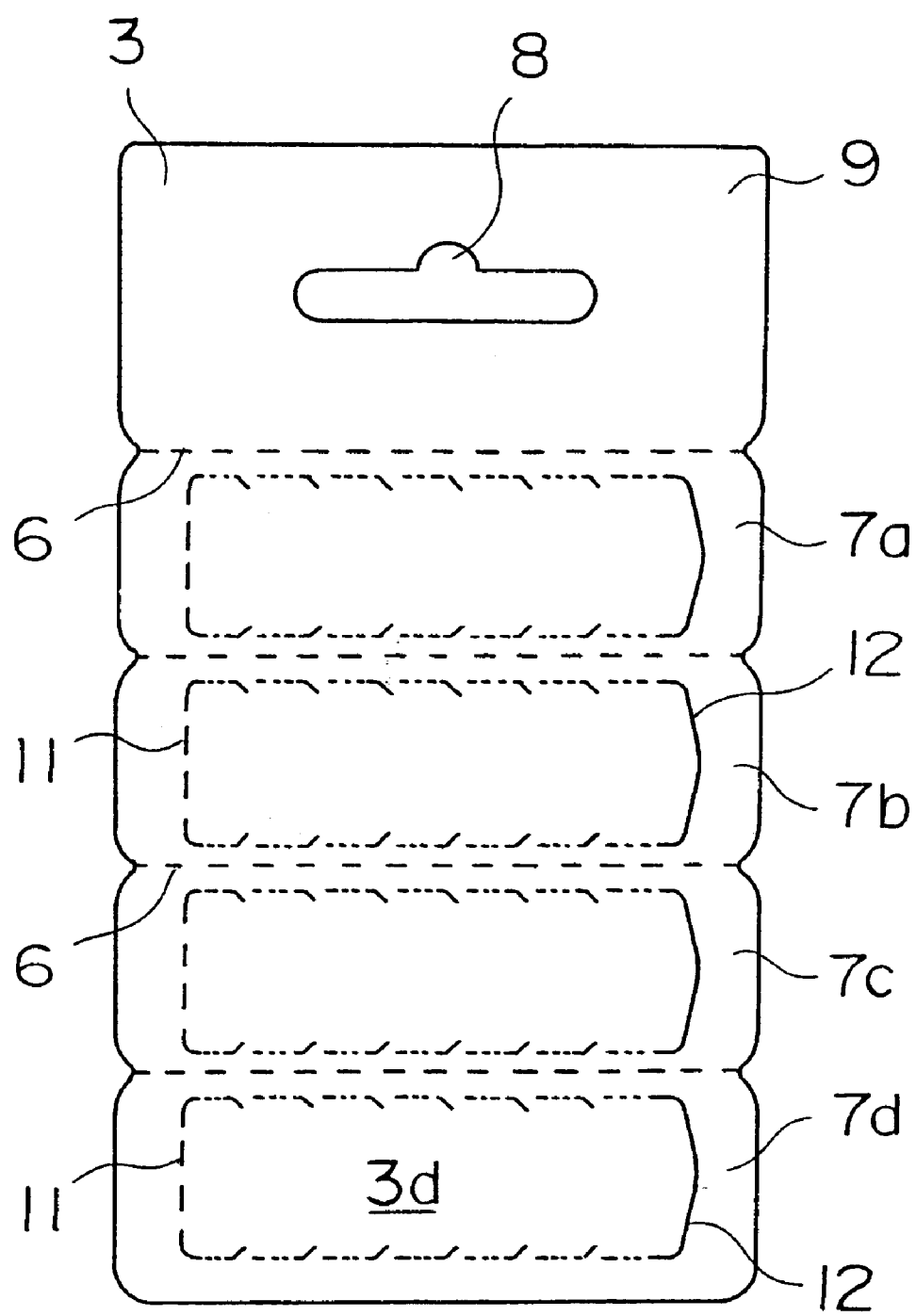
FIG. 2 is a rear view of the battery package shown in FIG. 1.

FIG. 1 is a perspective view showing the overall construction of a battery package in accordance with the present invention. FIG. 2 is a rear view of the battery package shown in FIG. 1.

Figure 4:
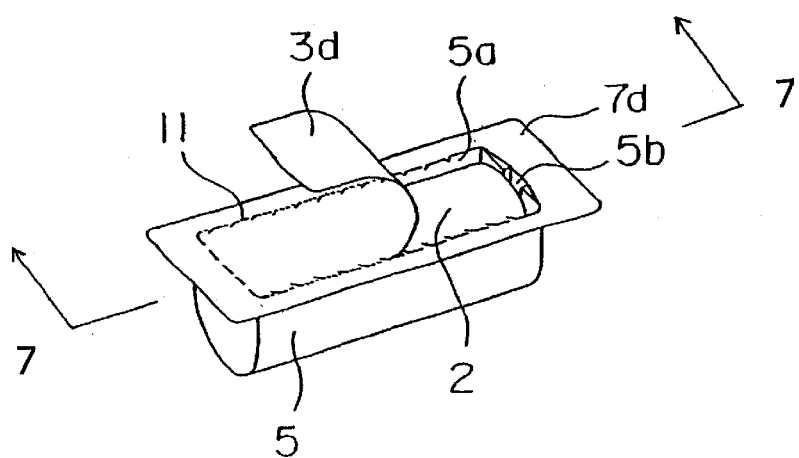
FIG. 4 is a perspective view illustrating the operation of opening the opening of the battery-containing recess of a unit package.

Battery package 1 includes a mounting board 3 comprising a paperboard on the rear side, a transparent synthetic resin film (comprising polyethylene terephthalate, for example) 4 with four battery holding portions 5 each having a recess 5a (see FIG. 4) for containing a battery, which protrudes on the front side, at a predetermined interval, and a cylindrical battery 2 contained in each recess 5a of the film 4 (see FIG. 4). By bonding the film 4 to the mounting board 3, the opening of each recess 5a is closed with the mounting board to contain each battery 2 in the recess 5a. Subsequently, for facilitating individual separation of each wrapped battery (unit package), a separating perforation 6 is formed so as to perforate both the mounting board and the film.

The battery package thus made has a structure in which four unit packages 7a, 7b, 7c and 7d are serially contiguous to a suspender piece 9 having a suspender hole 8, with the separating perforations 6 therebetween. The film 4 is provided with a convex portion 10 for reinforcing, which is recessed on the rear side, on the suspender piece 9, thereby preventing the suspender piece 9 from being bent or folded.

As shown in FIG. 2, the mounting board 3 is previously formed with an opening perforation 11 and a cut portion 12 for each recess 5a to be opened in taking out the battery contained in that recess of the film 4.

Figure 5:
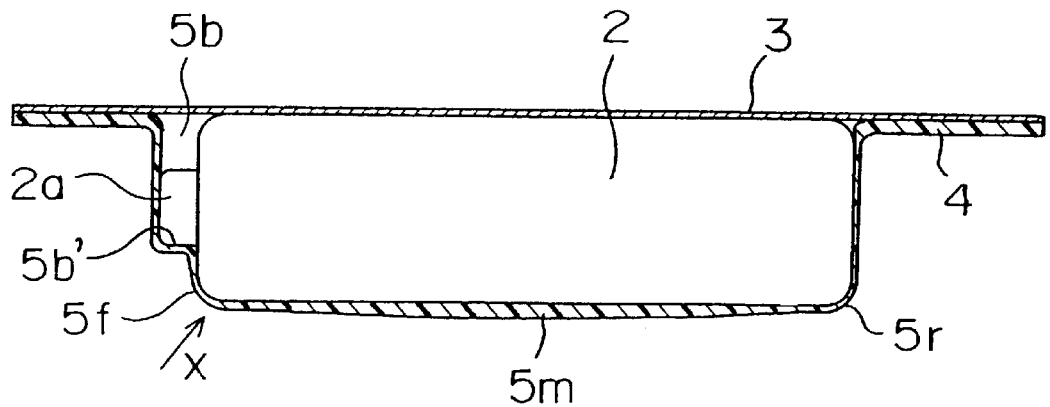
FIG. 5 is a sectional view of a relevant part of the battery package in accordance with Embodiment 1.

Next, the structure of the battery holding portion 5 of the film 4 is described with reference to FIG. 5.

The cylindrical battery 2 has a terminal cap, which is usually a cathode terminal cap 2a, protruding from one end thereof. Therefore, the recess 5a of the film 4 is formed with a groove 5b for guiding the terminal cap in a side wall corresponding to the terminal cap 2a. The recess 5a is designed to have a depth slightly smaller than the diameter of the battery and to press the terminal cap 2a toward the mounting board 3 at a terminating end 5b' of the groove 5b.

Figure 6:
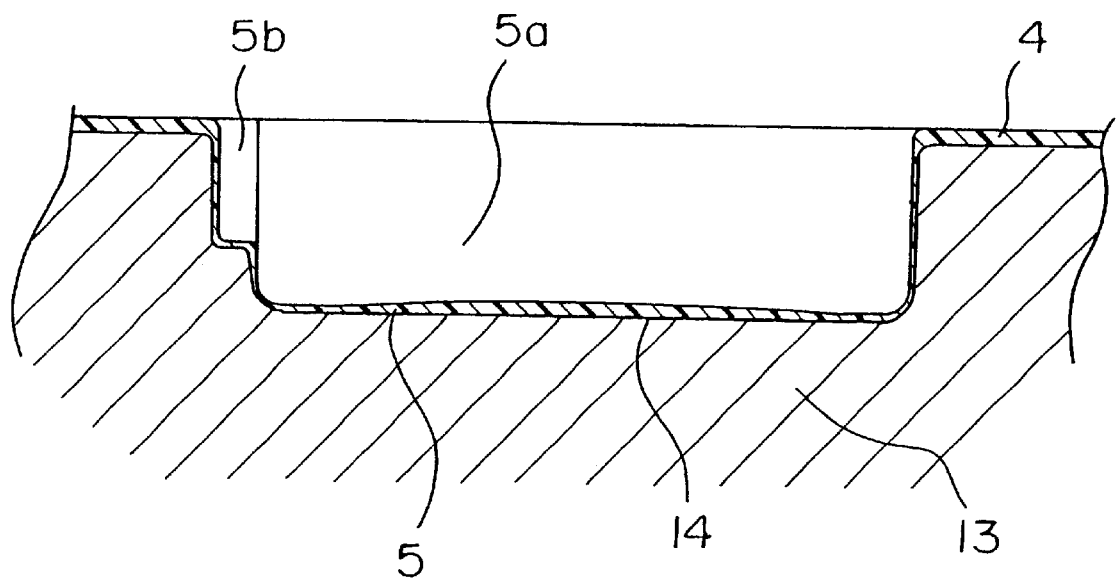
FIG. 6 s a sectional view of a molding die for providing the film of the battery package shown in FIG. 5 with a recess.

As shown in FIG. 6, the recess 5a of such a design is formed by placing a synthetic resin film on a molding die 13 having a cavity 14 shaped corresponding to the recess 5a having the groove 5b and by drawing the film into the cavity 14 by suction under heating to bring it into intimate contact with the cavity 14 of the molding die. The film resulting from this process is thicker in a central portion 5m at the bottom wall of the recess 5a and thinner in corner portions 5f and 5r corresponding to the peripheral edges of the battery.

The battery 2 is placed in each recess 5a of the film 4 thus formed in such a manner that the labeled surface thereof is positioned on the bottom wall of the recess, and then the film 4 is superposed on the mounting board 3 and bonded thereto by applying pressure under heating. Here, the mounting board is previously applied at the surface with a hot-melt adhesive.

Figure 3:
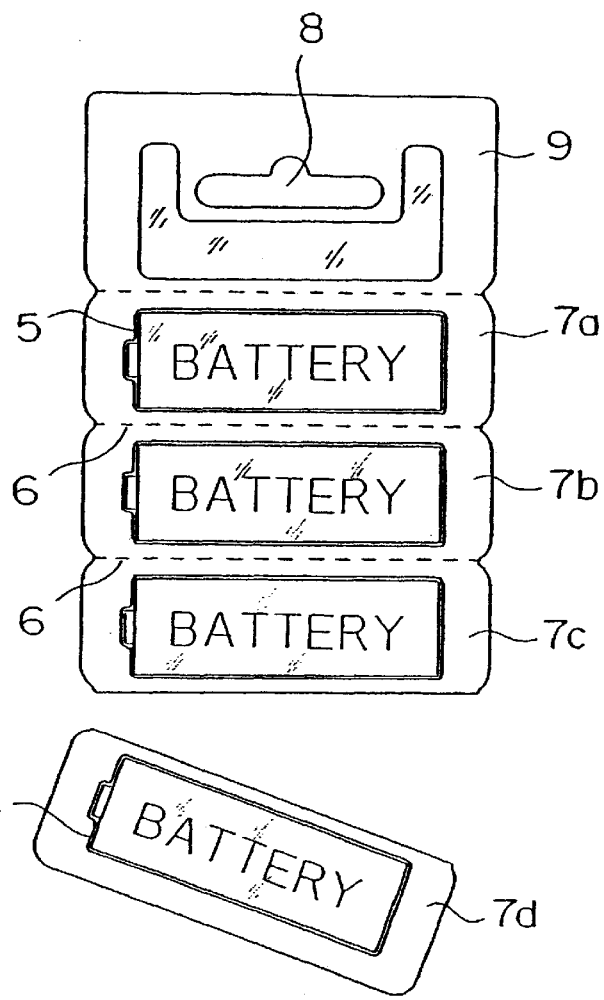
FIG. 3 is a front view of the battery package shown in FIG. 1 in a state where a unit package is separated from the battery package.

The lowermost unit package 7d of the above battery package is first separated at the separating perforation 6 as shown in FIG. 3, and then a tear-off portion 3d of the mounting board is pinched with fingers at the cut portion 12 and drawn toward the fingers to tear off the tear-off portion 3d at the opening perforation 11 as shown in FIG. 4. After having opened the opening of the recess 5a of the film 4, a corner portion, which corresponds to a peripheral edge of the battery 2, of the battery holding portion 5, i.e., the portion indicated by arrow X in FIG. 5 is pressed up from below with the middle finger, while the peripheral edge, on the side having the groove 5b, of the opening of the recess 5a is pinched with, for example, the thumb and forefinger. Since the corner portion is made thinner, such an operation can easily deform the film to spring the battery out of the recess 5a.

With this embodiment, the battery can readily be taken out from the recess 5a by pressing any one of the corner portions since the corner portions, which correspond to the both peripheral edges of the battery, of the battery holding portion 5 are made thinner.

While the mounting board is formed of a paperboard and the resin film is formed of polyethylene terephthalate in the above embodiment, the mounting board may be formed of polyethylene terephthalate as with the resin film, as described later. Alternatively, both the mounting board and the resin film may be formed of the same synthetic resin.

Embodiment 2

A battery package in accordance with Embodiment 2 of the present invention includes a transparent synthetic resin film provided with a plurality of aligned battery holding portions each having a recess for containing a single cylindrical battery, and a mounting board which is bonded to and supports the film and closes the opening of each recess.

The film and the mounting board have a separating perforation for separating each battery holding portion together with the mounting board from other portion. Stated otherwise, the separating perforation is provided for separating a unit package. The mounting board further has an opening perforation for opening the respective recess.

Each of the battery holding portions of such a battery package can be separated together with the mounting board along the separating perforation, and further, the mounting board can be torn off along the opening perforation. In other words, the battery package contains the plurality of batteries not collectively in one but independently one by one for the convenience of the user.

However, there exist problems that each battery holding portion may be difficult to separate together with the mounting board at the separating perforation or the portion of the mounting board closing each recess may be difficult to tear off at the opening perforation, both depending on the type or kind of the mounting board or the tearing direction, or the mounting board may not be clearly torn off.

Thus, in this embodiment, the paper fibers constituting the mounting board are aligned parallel to the separating perforation and the opening perforation at least in the longitudinal direction of the battery. Usually, these perforations are formed so as to extend in the longitudinal direction of the article contained in the recess of each battery-containing portion. Therefore, stated otherwise, the paper fibers are aligned in the longitudinal direction of the battery.

This feature allows each of the battery holding portions to be separated quickly without using an unnecessary force. Further, the mounting board covering each recess can be torn off along the opening perforation quickly without being torn at some midpoint, thus providing a clear-cut surface.

Generally, paper may have a layered structure, and in this case, a plurality of layers are laminated to form a paper.

Accordingly, where a mounting board having a plurality of layers is used in the present invention, the paper fibers in any one of the layers may be aligned parallel to the separating perforation and the opening perforation. To take the full advantage of the present invention, however, it is preferable that the paper fibers in all the layers should be aligned parallel to the separating perforation and the opening perforation.

Typically, paper is produced by a process mainly including the steps of: (1) making paper from paper fibers such as pulp in water; (2) drying the paper thus made; (3) winding up the paper thus obtained into a roll; and (4) cutting the paper to a certain size.

To obtain paper for use as the mounting board in accordance with this embodiment of the present invention, paper fibers need to be aligned in a constant direction in the step (1). Those skilled in the art can achieve such alignment appropriately by fixing the direction of the paper-making operation.

Additionally, various design changes may be made within the spirit of the present invention.

Specifically, various adaptations are possible so long as the object and advantage of easier tearing are maintained by aligning paper fibers existing around the separating perforation and the opening perforation parallel to these perforations.

Where a mounting board comprising a plurality of layers is used, paper fibers in at least one layer may be aligned parallel to the perforations in the longitudinal direction of the battery, and paper fibers in all the layers are not necessarily aligned parallel to the perforations. That is, as long as the advantage of the present invention is not impaired, paper fibers in one layer may be oriented parallel to the perforations, while paper fibers in the other layer may be oriented randomly or angularly to the perforations.

Figure 8:
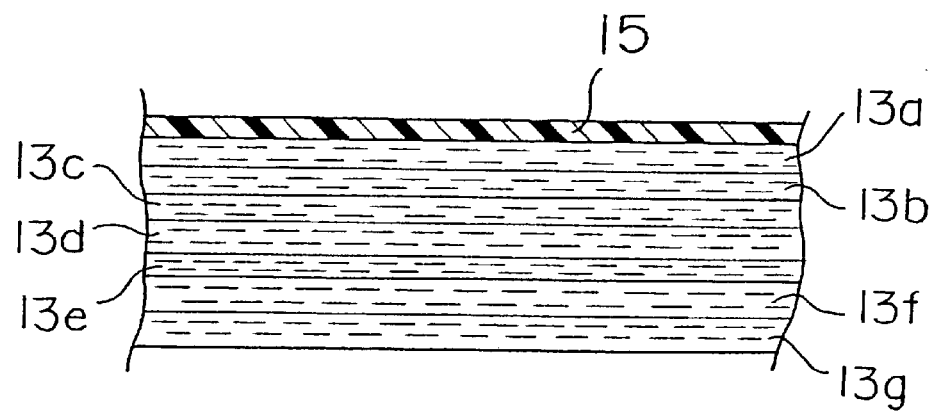
FIG. 8 is a schematic sectional view of a mounting board of paper used in Embodiment 2.

FIG. 8 is a schematic sectional view illustrating a mounting board 3 comprising a plurality of layers for use in the present invention. It should be noted that the mounting board of the present invention is not limited to this. The mounting board 3 comprises layers 13a, 13b, 13c, 13d, 13e, 13f and 13g. Although these layers are laminated one on another to form a single mounting board 3, typically the layers 13a and 13b, the layers 13c to 13e and the layers 13f and 13g, which are separately formed, are laminated.

The layer comprising the layers 13a and 13b is to be positioned on the front side of the battery package and need to have a front surface with good appearance and decorative nature and, hence, is usually formed from paper pulp free of recycled paper. Further, a surface coating layer 15 comprising, for example, china clay mainly composed of lime is provided to impart the front surface. with smoothness.

The layer comprising the layers 13c to 13e is usually formed from pulp recycled from used paper since it is not seen from the outside. The layer comprising the layers 13f and 13g is of the same composition as the layers comprising layers 13a and 13b since it is in a position which can be seen from the rear side of the battery package.

Figure 7:
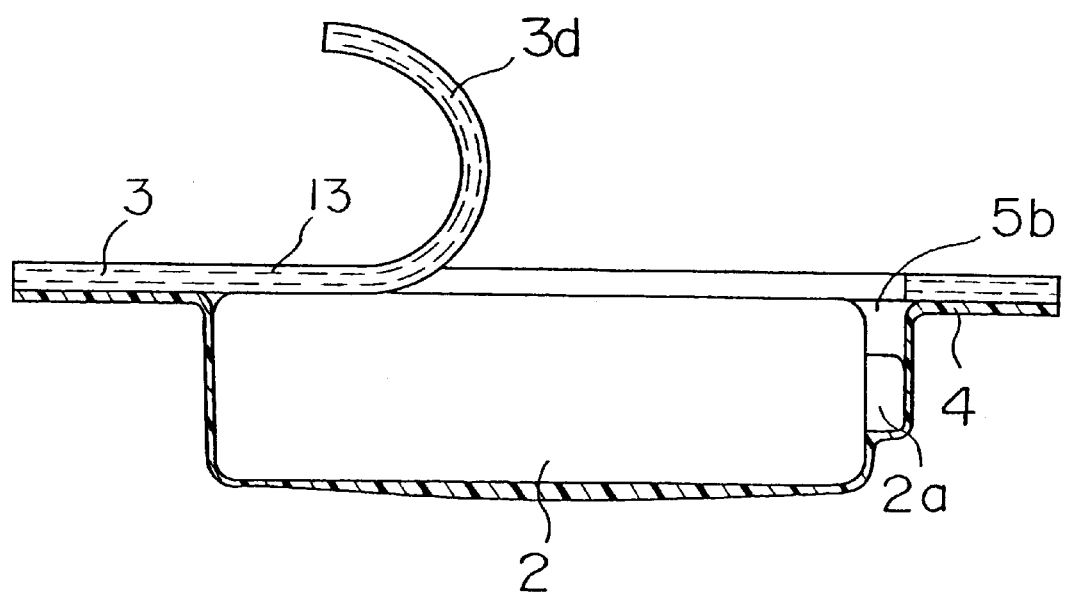
FIG. 7 is sectional view taken on line 7—7 in FIG. 4.

FIG. 7 is a sectional view taken on line 7—7 in FIG. 4. As shown in FIG. 7, the paper fibers of the mounting board 3 are aligned parallel to the opening perforation 11 in the longitudinal direction of the battery.

For this reason, the unit package 7d can readily be separated along the separating perforation as shown in FIG. 3. Further, the tear-off portion 3d of the mounting board 3 can readily be torn off along the opening perforation 11 as shown in FIG. 4.

It should be noted that other constituents may be appropriately selected so long as the advantages of the present invention are not impaired. For example, an arrangement similar to the foregoing Embodiment 1 may be employed.

Embodiment 3

A battery package in accordance with Embodiment 3 of the present invention includes a transparent synthetic resin film provided with a plurality of aligned battery holding portions each having a recess for containing a single cylindrical battery, and a transparent synthetic resin mounting board which is bonded to and supports the film and closes the opening of each recess. Further, the mounting board has an opening perforation for opening the recess in a portion other than the portion bonded to the film.

Such a battery package in accordance with the present invention has an advantage of allowing easy separate collection in the process of disposal and easy recycling since the film and the mounting board are made of the same material. Besides, it is also advantageous in that the user can see the article contained inside.

Further, since the mounting board has the opening perforation in a portion other than that bonded to the film for opening the recess, it has an advantage of easy tearing along the opening perforation.

Namely, in case where the synthetic resin film and the mounting board are bonded to each other, there is a problem that the bonded surfaces are firmly fixed and hence are difficult to tear even if a perforation is provided thereon. By contrast, in the present invention, such a problem can be avoided by employing the above-mentioned structure.

With reference to the figures, the battery package in accordance with Embodiment 3 of the present invention is described below.

The battery package in accordance with this embodiment is of the same constitution as that shown in FIG. 1 except that a synthetic resin board is used for the mounting board 3.

As the material constituting the film 4 and mounting board 3, any transparent synthetic resin which allows the mounting board to bond to the film 4 to close the opening of the recess 5a and to contain the battery 2 within the recess 5a may be used.

Specific examples of the transparent synthetic resin include, for instance, polyethylene terephthalate, polystyrene, vinyl chloride, polypropylene, polyethylene and the like. Among them, polyethylene terephthalate is preferable from the viewpoint of the superior transparency and flexural strength.

The battery 2 is placed in each recess 5a of the film 4 formed in the same manner as in Embodiment 1 such that the labeled surface thereof is positioned on the open side, and then the film 4 is superposed on the mounting board 3 and bonded thereto by applying pressure under heating. Here, the mounting board is previously applied on the surface with a hot-melt adhesive.

Figure 9:
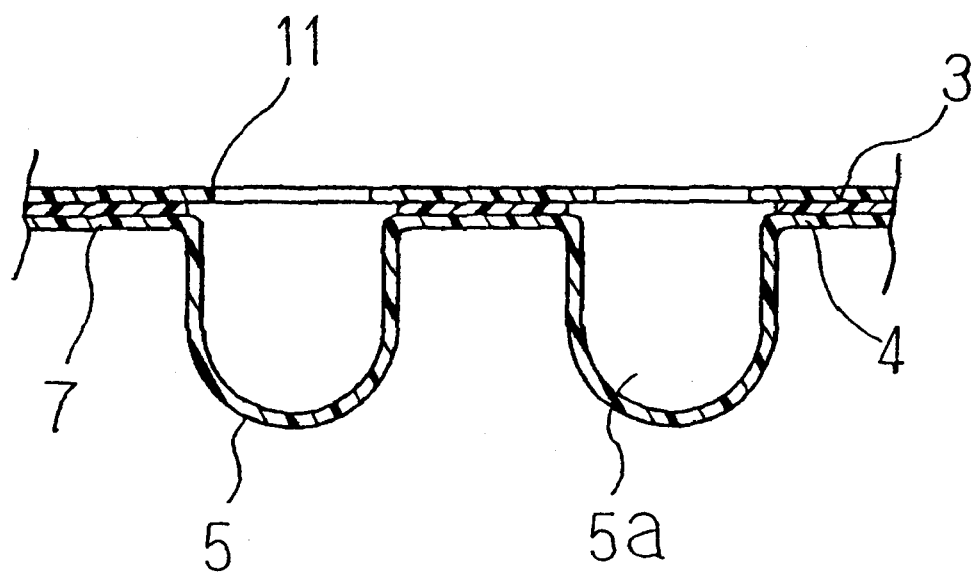
FIG. 9 is a schematic sectional view taken on line 9—9 in FIG. 1, of a battery package having a mounting board of a synthetic resin.

FIG. 9 is a schematic sectional view taken on line 9—9 in FIG. 1 of the battery package having the mounting board 3 formed of a synthetic resin.

As shown in FIG. 9, the film 4 and the mounting board 3 are joined together via a bonded portion 7 to hold the battery (not shown) within the recess 5a of each battery holding portion 5.

Then, the mounting board 3 has the opening perforation 11 for opening each recess in a portion other than that bonded to the film 4, namely in a portion facing opposite to each recess 5a. If this perforation 11 is formed on the bonded portion 7, it will be difficult to tear the mounting board 3 along the perforation 11 because of the firm bonding between the film 4 and the mounting board 3, both made of a synthetic resin.

On the contrary, in the present invention, by adopting the above arrangement, the perforation 11 can be torn easily even if the mounting board 3 and the film 4 both formed of a synthetic resin are used.

It should be noted that the film and the mounting board can be formed of any one of the synthetic resins mentioned above using a conventional method such as blow molding method or rolling method.

INDUSTRIAL APPLICABILITY

As has been described, the present invention can provide a battery package which contains a battery with the labeled surface showing the brand thereof or the like positioned on the front side constantly and allows the battery to be readily taken out for use.

Further, the present invention can provide a battery package which is formed of a single material and hence is suitable for separate collection and recycling.

What is claimed is:

1. A battery package comprising: a transparent synthetic resin film which is provided with at least one battery holding portion having a recess for containing a single cylindrical battery laterally; and a mounting board which is bonded to and supports said film and closes an opening of said recess, wherein a corner portion of said recess of said film corresponding to a peripheral edge of said cylindrical battery is thinner than the rest, and said corner portion is in contact with a corner portion of both peripheral edges of said cylindrical battery.

2. The battery package in accordance with claim 1, wherein said recess of said film has a groove for guiding a terminal cap of said cylindrical battery in a side wall of said recess corresponding to a terminal cap side of said battery, said battery is pressed against said mounting board at a terminating end of said groove, and said groove is open toward a direction of said mounting board.

3. The battery package in accordance with claim 1, wherein said mounting board is made of paper, and paper fibers constituting said mounting board are aligned parallel to an opening perforation provided on said mounting board in a longitudinal direction of said battery.

4. The battery package in accordance with claim 2, wherein said mounting board is made of paper, and paper fibers constituting said mounting board are aligned parallel to an opening perforation provided on said mounting board in a longitudinal direction of said battery.

5. The battery package in accordance with claim 1, wherein said mounting board is made of a synthetic resin and has an opening perforation in a portion which is not bonded to said film.

6. The battery package in accordance with claim 2, wherein said mounting board is made of a synthetic resin and having an opening perforation in a portion which is not bonded to said film.

* * * * *